United States Patent [19]

Gattuso et al.

[11] 3,879,461

[45] Apr. 22, 1975

[54] VULCANIZATION INHIBITING COMPOUNDS

[75] Inventors: Marion J. Gattuso, Hoffman Estates; Robert J. Arnold, Evanston, both of Ill.

[73] Assignee: Universal Oil Products Company, Des Plaines, Ill.

[22] Filed: Mar. 25, 1974

[21] Appl. No.: 454,627

[52] U.S. Cl. ............ 260/565; 260/564 A; 260/780
[51] Int. Cl. ........................................ C07c 129/08
[58] Field of Search ........................... 260/565, 564

[56] References Cited
UNITED STATES PATENTS
2,522,312  9/1950  Smith et al. ..................... 260/565

*Primary Examiner*—Leon Zitver
*Assistant Examiner*—Gerald A. Schwartz
*Attorney, Agent, or Firm*—James R. Hoatson, Jr.; Raymond H. Nelson; William H. Page, II

[57] ABSTRACT

Novel compounds for inhibiting the premature vulcanization of vulcanizable rubber formulations comprise sulfenyl-substituted guanidines. These novel compounds may be exemplified by 1,2,3-tris(phenylthio)-1,3-diphenylguanidine.

5 Claims, No Drawings

VULCANIZATION INHIBITING COMPOUNDS

BACKGROUND OF THE INVENTION

Rubber formulations, either synthetic or naturally occurring, must be processed in order to prepare finished products which are usable in industry. Among these processing features is the vulcanization of the rubber mixture by means well known in the art. In this respect various changes in the processing of rubber formulations have been adopted to facilitate the aforesaid processing, thereby improving the properties of the rubber products. When the rubber mixtures contain vulcanizing agents such as sulfur and accelerators, a certain amount of premature vulcanization, which is known in the trade as scorching, may occur prior to the proper vulcanization. In addition, other compounds may also be present in the rubber formulation which will also adversely effect the induction time or scorch duration period prior to vulcanization. For example, the rubber formulation may contain an antiozonant therein in order to impart protection to the finished rubber product against ozone cracking. Among the more popular antiozonants which are utilized for this purpose are the phenylenediamine type of compounds. However, this type of antiozonant appears to promote scorching or premature vulcanization. Another material which may be present and which may have an adverse effect on the vulcanization period is a high pH furnace black which appears to lack the inherent inhibiting effect of the acidic channel blacks. In the past it has been a common practice to utilize certain compounds to reduce the risk of scorching prior to vulcanization. However, such compounds have been of limited success and ofttimes have caused undesirable properties in the finished products.

In contrast to this it has now been found that novel compounds comprising the reaction products of a sulfenyl compound with a substituted guanidine may be utilized as vulcanization inhibitors in rubber formulations to allow control of premature scorch yet affording products which do not exhibit the unwanted characteristics of rubber formulations containing other vulcanization inhibitors which have been used in the past.

This invention relates to novel compounds comprising the reaction product of a sulfenyl chloride with a substituted guanidine, and more particularly to the use of these compounds as scorch inhibitors in the accelerated sulfur vulcanization of rubber formulations.

It is therefore an object of this invention to provide novel compounds of the type hereinafter set forth in greater detail which may be used as scorch inhibitors.

In one aspect an embodiment of this invention resides in a compound having the formula:

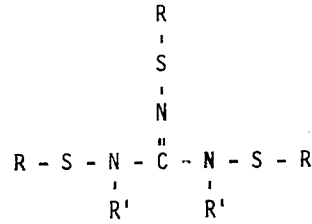

in which R and R' are independently selected from the group consisting of alkyl of from 1 to about 6 carbon atoms, cycloalkyl of from 3 to about 8 carbon atoms, phenyl and tolyl radicals.

Another embodiment of this invention resides in a vulcanizable rubber formulation containing, as an inhibitor against the premature vulcanization thereof, a compound having the formula:

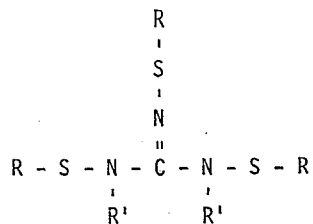

in which R and R' are independently selected from the group consisting of alkyl of from 1 to about 6 carbon atoms, cycloalkyl of from 3 to about 8 carbon atoms, phenyl and tolyl radicals.

A specific embodiment of this invention is found in a novel compound comprising 1,2,3-tris(phenylthio)-1,3-diphenylguanidine.

Another specific embodiment is found in a vulcanizable rubber formulation containing 1,2,3-tris(p-tolylthio)-1,3-diphenylguanidine.

Other objects and embodiments will be found in the following further detailed description of the present invention.

As hereinbefore set forth the present invention is concerned with novel compounds for inhibiting the scorch in the accelerated sulfur vulcanization of rubber, the compounds in particular comprising the reaction product between a sulfenyl chloride and a substituted guanidine. The novel compounds of the present invention may be prepared by reacting a substituted sulfenyl chloride with a substituted guanidine, said substituted sulfenyl compound being present in a ratio of from about 3:1 to about 5:1 moles of substituted sulfenyl halide per mole of substituted guanidine. The reaction is preferably effected at depressed temperatures ranging from about 0° up to about 20° C. and preferably in a range of from about 0° up to about 10° C. In addition the reaction is also effected in the presence of an acid scavenger and an organic solvent of the types hereinafter set forth in greater detail.

Examples of substituted sulfenyl halides and preferably substituted chlorides which may be employed as one of the starting materials in the present process will include those compounds having the generic formula:

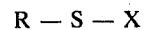

in which R is selected from the group consisting of alkyl of from 1 to about 6 carbon atoms, cycloalkyl of from 3 to about 8 carbon atoms, phenyl and tolyl radicals, and X is a halogen atom, preferably chlorine. Some representative compounds which may be enumerated will include methanesulfenyl chloride, ethanesulfenyl chloride, n-propanesulfenyl chloride, isopropanesulfenyl chloride, n-butanesulfenyl chloride, t-butanesulfenyl chloride, n-pentanesulfenyl chloride, sec-pentanesulfenyl chloride, n-hexanesulfenyl chloride, sec-hexanesulfenyl chloride, cyclopropanesulfenyl chloride, cyclobutanesulfenyl chloride, cyclopentanesulfenyl chloride, cyclohexanesulfenyl chloride, cycloheptanesulfenyl chloride, cyclooctanesulfenyl chloride, benzenesulfenyl chloride, o-toluenesulfenyl chloride, m-toluenesulfenyl chloride, p-toluenesulfenyl chloride, etc.

The aforementioned substituted sulfenyl halides are reacted with a substituted guanidine which will possess the generic formula:

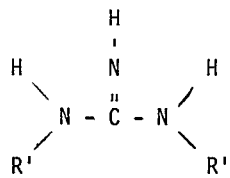

in which R' may be selected from the group consisting of alkyl of from 1 to about 6 carbon atoms, cycloalkyl of from 3 to about 8 carbon atoms, phenyl and tolyl radicals. Some representative examples of these compounds will include 1,3-dimethylguanidine, 1,3-diethylguanidine, 1,3-dipropylguanidine, 1,3-dibutylguanidine, 1,3-dipentylguanidine, 1,3-dihexylguanidine, 1,3-dicyclopropylguanidine, 1,3-dicyclobutylguanidine, 1,3-dicyclopentylguanidine, 1,3-dicyclohexylguanidine, 1,3-dicycloheptylguanidine, 1,3-dicyclooctylguanidine, 1,3-diphenylguanidine, 1,3-di-(o-tolyl)-guanidine, 1,3-di-(m-tolyl)-guanidine, 1,3-di-(p-tolyl)-guanidine, etc.

As hereinbefore set forth the reaction between at least 3 moles of substituted sulfenyl chloride and 1 mole of substituted guanidine is effected in the presence of an acid scavenger. In the preferred embodiment of the invention these acid scavengers will be basic in nature and will include such compounds as tertiary amines, examples of some tertiary amines which may be employed including trimethylamine, triethylamine, tri-n-propylamine, triisopropylamine, tri-n-butylamine, tri-t-butylamine, triphenylamine, etc. If so desired, the reaction may also be effected in the presence of an organic solvent including dimethylformamide, diethylformamide, dipropylformamide, benzene, toluene, xylene, etc.

The preparation of the novel compounds of the present invention may be effected in any suitable manner and may comprise either a batch or continuous type operation. For example, when a batch type operation is used, a quantity of the substituted guanidine along with the acid scavenger and the solvent is placed in an appropriate apparatus and thereafter cooled, preferably from about 0° to about 10° C. utilizing any cooling means known in the art such as, for example, an ice bath. Following this the substituted sulfenyl chloride, which may be prepared by treating a substituted disulfide with chlorine gas, is slowly added to the aforementioned substituted guanidine while maintaining the reaction mixture at depressed temperatures, said addition being accompanied by a vigorous mixing of the solution. Upon completion of the addition of the substituted sulfenyl chloride, the solution is allowed to warm to room temperature. After reaching room temperature, the solution is thereafter treated in a conventional manner such as washing, drying, separation, crystallization, recrystallization, etc., whereby the desired product is separated and recovered.

It is also contemplated within the scope of this invention that the desired product may be obtained in a continuous manner of operation. When this type of operation is employed the starting materials are charged to a reaction zone which is maintained at the proper operation conditions of temperature and pressure. In addition, the reaction zone may contain the acid scavenger such as a tertiary amine and the solvent or, if so desired, these compounds may be admixed with one or both of the starting materials prior to entry into said reaction zone and the resulting mixture is charged thereto in a single stream. Upon completion of the desired reaction time, the effluent is continuously removed and subjected to separation and recovery means similar in nature to those hereinbefore set forth whereby the desired product is recovered while any unreacted starting materials may, after further treatment, be recycled to the reaction zone to form a portion of the feed stock.

The novel compounds of the present invention which may be prepared according to the above set forth process will possess the generic formula:

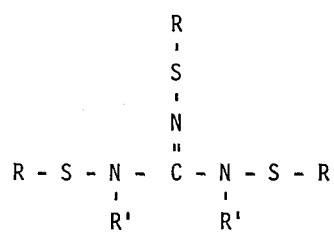

in which R and R' are independently selected from the group consisting of alkyl of from 1 to about 6 carbon atoms, cycloalkyl of from 3 to about 8 carbon atoms, phenyl and tolyl radicals. Some specific examples of these compounds will include 1,2,3-tris(methylthio)-1,3-diphenylguanidine, 1,2,3-tris(ethylthio)-1,3-diphenylguanidine, 1,2,3-tris(propylthio)-1,3-diphenylguanidine, 1,2,3-tris(pentylthio)-1,3-diphenylguanidine, 1,2,3-tris(hexylthio)-1,3-diphenylguanidine, 1,2,3-tris(cyclopropylthio)-1,3-diphenylguanidine, 1,2,3-tris(cyclobutylthio)-1,3-diphenylguanidine, 1,2,3-tris(cyclopentylthio)-1,3-diphenylguanidine, 1,2,3-tris(cyclohexylthio)-1,3-diphenylguanidine, 1,2,3-tris(cycloheptylthio)-1,3-diphenylguanidine, 1,2,3-tris (cyclooctylthio)-1,3-diphenylguanidine, 1,2,3-tris(phenylthio)-1,3-diphenylguanidine, 1,2,3-tris(o-tolylthio)-1,3-diphenylguanidine, 1,2,3-tris(m-tolylthio)-1,3-diphenylguanidine, 1,2,3-tris(p-tolylthio)-1,3-diphenylguanidine, 1,2,3-tris(methylthio)-1,3-di-p-tolylguanidine, 1,2,3-tris(propylthio)-1,3-di-p-tolylguanidine, 1,2,3-tris(hexylthio)-1,3-di-p-tolylguanidine, 1,2,3-tris(cyclobutylthio)-1,3-di-p-tolylguanidine, 1,2,3-tris(cyclohexylthio)-1,3-di-p-tolylguanidine, 1,2,3-tris(cyclooctylthio)-1,3-di-p-tolylguanidine, 1,2,3-tris(o-tolylthio)-1,3-di-p-tolylguanidine, 1,2,3-tris(p-tolylthio)-1,3-di-p-tolylguanidine, 1,2,3-tris(methylthio)-1,3-dihexylguanidine, 1,2,3-tris(propylthio)-1,3-dihexylguanidine, 1,2,3-tris(hexylthio)-1,3-dihexylguanidine, 1,2,3-tris(cyclobutylthio)-1,3-dihexylguanidine, 1,2,3-tris(cyclohexylthio)-1,3-dihexylguanidine, 1,2,3-tris(cyclooctylthio)-1,3-dihexylguanidine, 1,2,3-tris(o-tolylthio)-1,3-dihexylguanidine, 1,2,3-tris(p-tolylthio)-1,3-dihexylguanidine, 1,2,3-tris(ethylthio)-1,3-dicylcohexylguanidine, 1,2,3-tris(pentylthio)-1,3-dicyclohexylguanidine, 1,2,3-tris(cyclopropylthio)-1,3-dicyclohexylguanidine, 1,2,3-tris(cyclopentylthio)-1,3-dicyclohexylguanidine, 1,2,3-tris(cycloheptylthio)-1,3-dicyclohexylguanidine, 1,2,3-tris(phenylthio)-1,3-dicyclohexylguanidine, 1,2,3-tris(m-tolylthio)-1,3-dicyclohexylguanidine, 1,2,3-tris(ethylthio)-1,3-dibutylguanidine, 1,2,3-tris(pentylthio)-1,3-dibutylguanidine, 1,2,3-tris(cyclopropylthio)-1,3-dibutylguanidine, 1,2,3-tris(cyclopentylthio)-1,3-dibutylguanidine, 1,2,3-tris(cycloheptylthio)-1,3-dibutylguanidine, 1,2,3-tris(phenylthio)-1,3-dibutylguanidine, 1,2,3-tris(m-tolylthio)-1,3-dibutylguanidine, etc. It is to be understood that the aforementioned novel compounds are only representative of the class of compounds which may be prepared, and that the present invention is not necessarily limited thereto.

The aforementioned novel compounds comprising sulfenyl-substituted guanidines are used as inhibitors in rubber formulations in any suitable concentration, said concentration varying with the particular rubber formulation. In the preferred embodiment of the invention the concentration may be within a range of from about 0.1 to about 5 and more specifically in a range of from about 0.1 to about 2 phr (parts per hundred parts by weight of rubber hydrocarbon).

As was previously set forth, these compounds are used in any vulcanizable rubber formulation, either synthetic or naturally occurring, in order to inhibit premature vulcanization. Some illustrative examples of the rubber formulations would include methyl rubber, Buna S, SBR (styrene-butadiene), polymers of butadiene or copolymers thereof with other monomers such as, for example, acrylonitrile, isobutylene, methyl methacrylate, cis-4-polybutadiene, butyl rubber, ethylene propylene terpolymers, etc.

As was previously discussed, in order to protect the finished rubber product against cracking due to ozone, an antiozonant generally is incorporated in the rubber formulation. Any suitable antiozonant may be used and, in one embodiment, is of the phenylenediamine type. This type of compound will include, for example, N,N'-di-sec-alkyl-p-phenylenediamines, in which each alkyl substituent contains from 3 to 12 carbon atoms, and N-phenyl-N'-sec-alkyl-p-phenylenediamines, in which the alkyl substituent contains from 3 to 12 carbon atoms, N,N'-dicyclohexyl-p-phenylenediamines, N-phenyl-N'-cyclohexyl-p-phenylenediamines, etc. In another embodiment the rubber formulation may include antiozonants which are of the aminophenyl types and include alkyl-substituted aminophenols in which the alkyl substituent on the nitrogen atom will contain from 3 to 20 carbon atoms or cycloalkyl-substituted p-aminophenyls in which the cycloalkyl substituent on the nitrogen atom will contain from 3 to 12 carbon atoms in the ring. In most rubber formulations the antiozonant may be present in a concentration of from about 1 to about 5 parts by weight per hundred parts of rubber hydrocarbon in the formulation.

In addition to the antiozonant, the rubber formulation will generally include a vulcanization accelerator. Any suitable vulcanizing accelerator may be used including the conventional types such as 2-mercaptobenzothiazole, N-cyclohexyl-2-benzothiazole sulfenamide, N-tert-butyl-2-benzothiazole sulfenamide, 2-(morpholinothio)-benzothiazole, N-phenyl-2-benzothiazole sulfenamide, amine salts of mercaptobenzothiazole accelerators, etc. Other accelerators include tetramethylthiuram disulfide, thiocarbamyl sulfenamides, thioureas, xanthates, guanidine derivatives, etc. The vulcanizing accelerator will be used in conventional concentrations in the rubber formulation and may be within the range of from about 0.4 to about 3.0 parts by weight per hundred parts of rubber hydrocarbon in the formulation. It is understood that smaller or larger concentrations may be used when desired.

As hereinbefore set forth the compounds of the present invention are also present in the rubber formulation in order to retard or inhibit the scorch in the accelerated sulfur vulcanization of the rubber formulation when said vulcanization is carried out at the usual temperature which may range from about 120° to about 170° C. or more. By utilizing these compounds, as will hereinafter be shown in greater detail in the appended examples, it is possible to retard the scorch which is present in the accelerated sulfur vulcanization of rubber thus preventing any premature vulcanization which is undesirable and which may lead to the preparation of finished rubber products which do not possess desirable characteristics.

The following examples are used to illustrate the novel compounds of the present invention and also to their use as prevulcanization inhibitors. However, these examples are not intended to limit the generally broad scope of the present invention in strict accordance therewith.

EXAMPLE I

Benzenesulfenyl chloride was prepared by condensing 10.7 grams (0.15 mole) of chlorine in a large test tube at dry ice temperature followed by addition as a gas on spontaneous evaporation to a stirred solution of 32.7 grams (0.15 mole) of phenyl disulfide in 50 cc. of methylene chloride, the addition being accomplished while maintaining the temperature of the solution in a range of from about −5° to about −15° C. The resulting solution which contained 0.3 mole of benzenesulfenyl chloride was slowly added dropwise to a continuously stirred solution containing 21.1 grams (0.1 mole) of 1,3-diphenylguanidine, 33.3 grams (0.33 mole) of triethylamine, and 200 cc. of benzene, said addition being accomplished while maintaining the temperature of the solution in a range of from about −5° to about +5° C. Upon addition of the benzenesulfenyl chloride, the orange-red color of the benzenesulfenyl chloride disappeared and a fine white precipitate comprising triethylamine hydrochloride formed. Upon completion of the addition of the benzenesulfenyl chloride, the mixture was stirred for an additional period of 30 minutes at room temperature and thereafter filtered. The filter cake was washed with benzene and the filtrate and washings were combined and washed several times with water. Following this the solution was dried over magnesium sulfate and the benzene solvent was removed. The resulting viscous oil crystallized slowly and the crystals were thereafter recrystallized from a 2-propanol ethyl acetate solution. The desired product comprised colorless crystals having a melting point of from 134° to 136° C., said crystals being 1,2,3-tris(phenylthio)-1,3-diphenylguanidine. The crystals were analyzed with the following results:

Calculated for: $C_{31}H_{25}N_3S_3$:    C, 69.50%; H, 4.70%; N, 7.84%
Found:    C, 69.63%; H, 4.74%; N, 7.50%

EXAMPLE II

In this example chlorine gas was condensed in a large test tube which was fitted with a condenser, the apparatus and chlorine being cooled to a dry ice temperature. Following this 3.5 grams (0.05 mole) of chlorine was added as a gas on spontaneous evaporation to a stirred solution of 12.5 grams (0.05 mole) of cyclohexyl disulfide in 30 cc. of methylene chloride, the solution being previously cooled to a temperature of from $-5°$ to $-10°$ C. A stirred solution consisting of 10.6 grams (0.05 mole) of diphenylguanidine, 11.1 grams (0.11 mole) of triethylamine in 100 cc. of dimethylformamide was cooled to a temperature of $0°$ C. The cyclohexanesulfenyl chloride was slowly added dropwise to the diphenylguanidine solution while maintaining the temperature in a range of from $0°$ to $10°$ C. An exothermic reaction occurred with the concurrent precipitation of triethylamine hydrochloride as a fine white solid. The slurry was stirred for an additional period of 1 hour while allowing the temperature of the solution to reach room temperature. Thereafter 100 cc. of water and 100 cc. of methylene chloride were added. The organic layer was washed several times with water, dried over magnesium sulfate and the solvent was removed. The resulting yellow oil slowly crystallized and the crystals were isolated by filtration, the crystals which comprised 1,2,3-tris(cyclohexylthio)-1,3-diphenylguanidine had a melting point of from $123°$ to $127°$ C.

EXAMPLE III

In this example 7 grams (0.1 mole) of chlorine are condensed in a test tube at dry ice temperature and thereafter added as a gas on spontaneous evaporation to a stirred solution of 24.6 grams (0.1 mole) of p-tolyl disulfide in 50 cc. of methylene chloride, the temperature of the solution being maintained in a range of from about $-5°$ to about $-10°$ C. The resulting solution which contains 0.2 mole of p-toluenesulfenyl chloride is then slowly added to a solution consisting of 15.6 grams (0.067 mole) of 1,3-diphenylguanidine, 22.2 grams (0.22 mole) of triethylamine and 200 cc. of dimethylformamide. The addition of the p-toluenesulfenyl chloride is accomplished while maintaining the temperature of the solution in a range of from $0°$ to $5°$ C. by means of an ice bath. Upon completion of the addition of the sulfenyl chloride, the temperature of the solution is allowed to warm to room temperature and thereafter the mixture is stirred for an additional period of 0.5 hours. The solution is then filtered to remove the triethylamine hydrochloride which precipitates out. The triethylamine hydrochloride precipitate is washed several times with methylene chloride, the washings are combined with the filtrate and thereafter the combined solution is washed with water, dried over magnesium sulfate and the solvent is removed by vacuum. The viscous oil which remains is allowed to crystallize and thereafter the crystals are recrystallized from a 2-propanol ethyl acetate solution. The desired product comprising 1,2,3-tris(p-tolylthio)-1,3-diphenylguanidine is recovered.

EXAMPLE IV

In this example hexanesulfenyl chloride is prepared by condensing 10.7 grams (0.15 mole) of chlorine and adding the condensed chlorine as a gas on spontaneous evaporation to a solution of 38.1 grams (0.15 mole) of hexyl disulfide in 50 cc. of methylene chloride, the addition of the chlorine to the hexyl disulfide being effected while maintaining the temperature of the solution in a range of from $-5°$ to $-10°$ C. Following this the resultant hexanesulfenyl chloride is slowly added dropwise to a mechanically stirred solution comprising 22.7 grams (0.1 mole) of 1,3-dibenzylguanidine, 33.3 grams (0.33 mole) of triethylamine and 200 cc. of benzene. After allowing the mixture to warm to room temperature and stirring for an additional period of 1 hour, the reaction mixture is filtered to remove the solid triethylamine hydrochloride which is formed during the reaction. The solid is then washed with benzene and the washings are combined with the filtrate. Following this the filtrate and washings are washed with water, dried over magnesium sulfate and the benzene solvent is stripped from the mixture. The desired product comprising 1,2,3-tris(n-hexylthio)-1,3-dibenzylguanidine is recovered as a viscous amber oil.

EXAMPLE V

Benzenesulfenyl chloride (0.3 mole) is prepared in a manner similar to that set forth in Example I above and added dropwise to a mechanically stirred solution which contains 17.1 grams (0.1 mole) of 1,3-dibutylguanidine, 33.3 grams (0.33 mole) of triethylamine and 200 cc. of benzene, said addition being effected while maintaining the temperature of the solution in a range of from $0°$ to $10°$ C. Upon completion of the addition of the benzenesulfenyl chloride which is accompanied by continuous stirring, the mixture is allowed to warm to room temperature and stirred for an additional period of 1 hour. The triethylamine hydrochloride which precipitates is removed by filtration and washed with additional amounts of benzene. The benzene washings are combined with the filtrate and the combined organic mixture is washed with water, dried over magnesium sulfate followed by removal of the benzene solvent. The desired product comprising 1,2,3-tris(phenylthio)-1,3-dibutylguanidine is recovered as a viscous oil.

EXAMPLE VI

To illustrate the ability of the novel compounds of the present invention to act as scorch inhibitors in accelerated vulcanization of rubber the scorch properties of a rubber formulation were determined with a large rotor Mooney Viscometer at $250°$ F. (ASTM D-1077-55T). The values represent the number of minutes for a rubber containing a curing agent to increase in viscosity by 1 and then by 10 points. This method simulates conditions encountered during milling and subsequent vulcanization. A long scorch time indicates a high resistance to scorching. A rubber formulation was prepared according to the following recipe:

| Ingredient | Parts by Weight |
|---|---|
| SBR 1502 | 100.00 |
| Furnace Black | 40.00 |
| Oil Extender | 10.00 |
| Zinc Oxide | 3.00 |
| Stearic Acid | 2.00 |
| Sulfur | 2.00 |
| Antiozonant | 2.00 |
| Accelerator* | 0.90 |
| Inhibitor | 0.50–1.00 |

*N-t-(butyl)benzothiazole-2-sulfenamide

The above ingredients were incorporated by conventional milling procedures.

In the following table the results of these tests are reported along with a control run in which no scorch inhibitor was used in the rubber formulation. In this table the blank test is reported as Run A. In Run B the rubber formulation contains 0.50 parts per hundred parts by weight of rubber hydrocarbon of 1,2,3-tris(cyclohexylthio)-1,3-diphenylguanidine. Run C contains 1.00 parts of this compound. Run D contains 0.50 parts by weight of the rubber formulation of 1,2,3-tris(phenylthio)-1,3-diphenylguanidine and Run E contains 1.00 parts by weight of the 1,2,3-tris(phenylthio)-1,3-diphenylguanidine.

| Run | Mooney Scorch Data | | | % Increase in 1 pt rise |
|-----|--------|---------|------|--------|
|     | 1 pt rise | 10 pt rise | AID-1 |  |
| A   | 5.6    | 6.8     | 1.2  | —      |
| B   | 5.4    | 6.7     | 1.3  | 0      |
| C   | 6.2    | 7.3     | 1.1  | 10.7   |
| D   | 8.6    | 10.1    | 1.5  | 53.6   |
| E   | 10.6   | 12.1    | 1.5  | 89.3   |

It is to be noted from the above table that the rubber formulations which contain the novel compounds of the present invention acting as scorch inhibitors will exhibit a percentage increase in the 1 point rise time in three or four instances, the percentage increase will range from 10.7% when using 1.00 parts of 1,2,3-tris(cyclohexylthio)-1,3-diphenylguanidine up to 89.3% increase when using 1.00 parts of 1,2,3-tris(phenylthio)-1,3-diphenylguanidine. This constitutes a clear indication of the fact that the novel compounds of the present invention possess the ability to inhibit the premature vulcanization of a rubber formulation.

In like manner when other compounds such as 1,2,3-tris(phenylthio)-1,3-dibutylguanidine, 1,2,3-tris(n-hexylthio)-1,3-dibenzylguanidine and 1,2,3-tris(p-tolylthio)-1,3-diphenylguanidine are admixed with similar rubber formulations, it will be found that the premature vulcanization of the rubber formulation will also be inhibited in like manner.

We claim as our invention:

1. A compound having the formula:

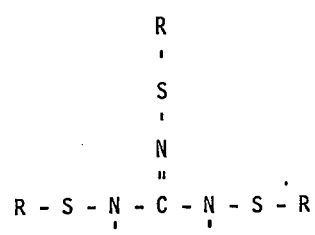

in which R and R' are independently selected from the group consisting of alkyl of from 1 to about 6 carbon atoms, cycloalkyl of from 3 to about 8 carbon atoms, phenyl and tolyl radicals.

2. The compound of claim 1 being 1,2,3-tris(phenylthio)-1,3-diphenylguanidine.

3. The compound of claim 1 being 1,2,3-tris(p-tolylthio)-1,3-diphenylguanidine.

4. The compound of claim 1 being 1,2,3-tris(cyclohexylthio)-1,3-diphenylguanidine.

5. The compound of claim 1 being 1,2,3-tris(phenylthio)-1,3-dibutylguanidine.

* * * * *